United States Patent
Agarwal et al.

(10) Patent No.: US 9,106,555 B2
(45) Date of Patent: Aug. 11, 2015

(54) TROUBLESHOOTING ROUTING TOPOLOGY BASED ON A REFERENCE TOPOLOGY

(75) Inventors: Navneet Agarwal, Bangalore (IN); Jean-Philippe Vasseur, Saint Martin d'Uriage (FR); Ajay Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 13/358,217

(22) Filed: Jan. 25, 2012

(65) Prior Publication Data

US 2013/0191688 A1  Jul. 25, 2013

(51) Int. Cl.
*G06F 11/28* (2006.01)
*H04L 12/24* (2006.01)

(52) U.S. Cl.
CPC ............ *H04L 41/12* (2013.01); *H04L 41/0873* (2013.01)

(58) Field of Classification Search
CPC ............................ H04L 41/12; H04L 41/0873
USPC ............................ 370/254, 252, 256; 709/242
See application file for complete search history.

(56) References Cited

U.S. PATENT DOCUMENTS

| 5,583,991 | A | 12/1996 | Chatwani et al. |
| 6,574,663 | B1 * | 6/2003 | Bakshi et al. ................. 709/223 |
| 8,588,108 | B2 * | 11/2013 | Vasseur et al. ................ 370/255 |
| 2004/0213274 | A1 | 10/2004 | Fan et al. |
| 2004/0233855 | A1 * | 11/2004 | Gutierrez et al. ............ 370/252 |
| 2007/0014290 | A1 | 1/2007 | Dec et al. |
| 2007/0197206 | A1 | 8/2007 | Olson et al. |
| 2008/0181136 | A1 | 7/2008 | Watanabe et al. |
| 2008/0205390 | A1 | 8/2008 | Bangalore et al. |
| 2008/0307054 | A1 | 12/2008 | Kamarthy et al. |
| 2011/0080854 | A1 * | 4/2011 | Farkas et al. .................. 370/256 |

(Continued)

FOREIGN PATENT DOCUMENTS

EP    1011283 A2    6/2000

OTHER PUBLICATIONS

Chen (CN 102082710 A) Method and system for implementing detection on network topology fault of nodes in network Jun. 1, 2011 (translation enclosed) ).*

(Continued)

*Primary Examiner* — Donald Mills
*Assistant Examiner* — Henry Baron
(74) *Attorney, Agent, or Firm* — Parker Ibrahim & Berg LLC; James M. Behmke; Stephen D. LeBarron

(57) ABSTRACT

In one embodiment, a computing device (e.g., border router or network management server) transmits a discovery message into a computer network, such as in response to a given trigger. In response to the discovery message, the device receives a unicast reply from each node of a plurality of nodes in the computer network, each reply having a neighbor list of a corresponding node and a selected parent node for the corresponding node. Based on the neighbor lists from the replies and a routing protocol shared by each of the plurality of nodes in the computer network, the device may create a reference topology for the computer network, and based on the selected parent nodes from the replies, may also determine a current topology of the computer network. Accordingly, the device may then compare the current topology to the reference topology to detect anomalies in the current topology.

21 Claims, 12 Drawing Sheets

(56) References Cited

U.S. PATENT DOCUMENTS

2011/0103344 A1 5/2011 Gundavelli et al.
2011/0231659 A1 9/2011 Sinha
2011/0320570 A1* 12/2011 Ewing .......................... 709/218

OTHER PUBLICATIONS

Pozzi, et al., "Notification of Transmittal of the International Search Report and the Written Opinion of the International Searching Authority, or the Declaration", Patent Cooperation Treaty, May 7, 2013, PCT/US2013/023138, 11 pages, European Patent Office, Rijswijk, Netherlands.

Gnawali, et al., "The Minimum Rank Objective Function with Hysteresis", draft-ieft-roll-minrank-hysteresis-of-04, IETF Internet-Draft, May 2011, 11 pages.

Thubert, et al., "RPL Objective Function Zero", draft-ietf-roll-of0-15, IETF Internet-Draft, Jul. 2011, 14 pages.

Vasseur, et al., "Routing Metrics Used for Path Calculation in Low Power and Lossy Networks", draft-ietf-roll-routing-metrics-19, IETF Internet-Draft, Mar. 2011, 31 pages.

Winter, et al., "RPL: IPv6 Routing Protocol for Low Power and Lossy Networks", draft-ietf-roll-rpl-19, IETF Internet-Draft; Mar. 2011, 164 pages.

* cited by examiner

TROUBLESHOOTING ROUTING TOPOLOGY BASED ON A REFERENCE TOPOLOGY

TECHNICAL FIELD

The present disclosure relates generally to computer networks, and, more particularly, to routing topologies in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Even with a well-intentioned routing protocol, however, it is worth noting that various misconfigurations and errors may arise in operation. For instance, though an in-use DAG may provide connectivity to all nodes, it may not conform to particular objective of the topology (e.g., low-latency). Alternatively, nodes in the network may not be connected to the DAG, or else loops may be created. In other words, errors in selecting a parent (or best next hop in general) by some nodes could lead to sub-optimal paths or a breakdown of portions of the network, neither of which are strictly local issues, but rather could impact all of the nodes attached to the faulty node by using the faulty node along their path to certain destinations.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
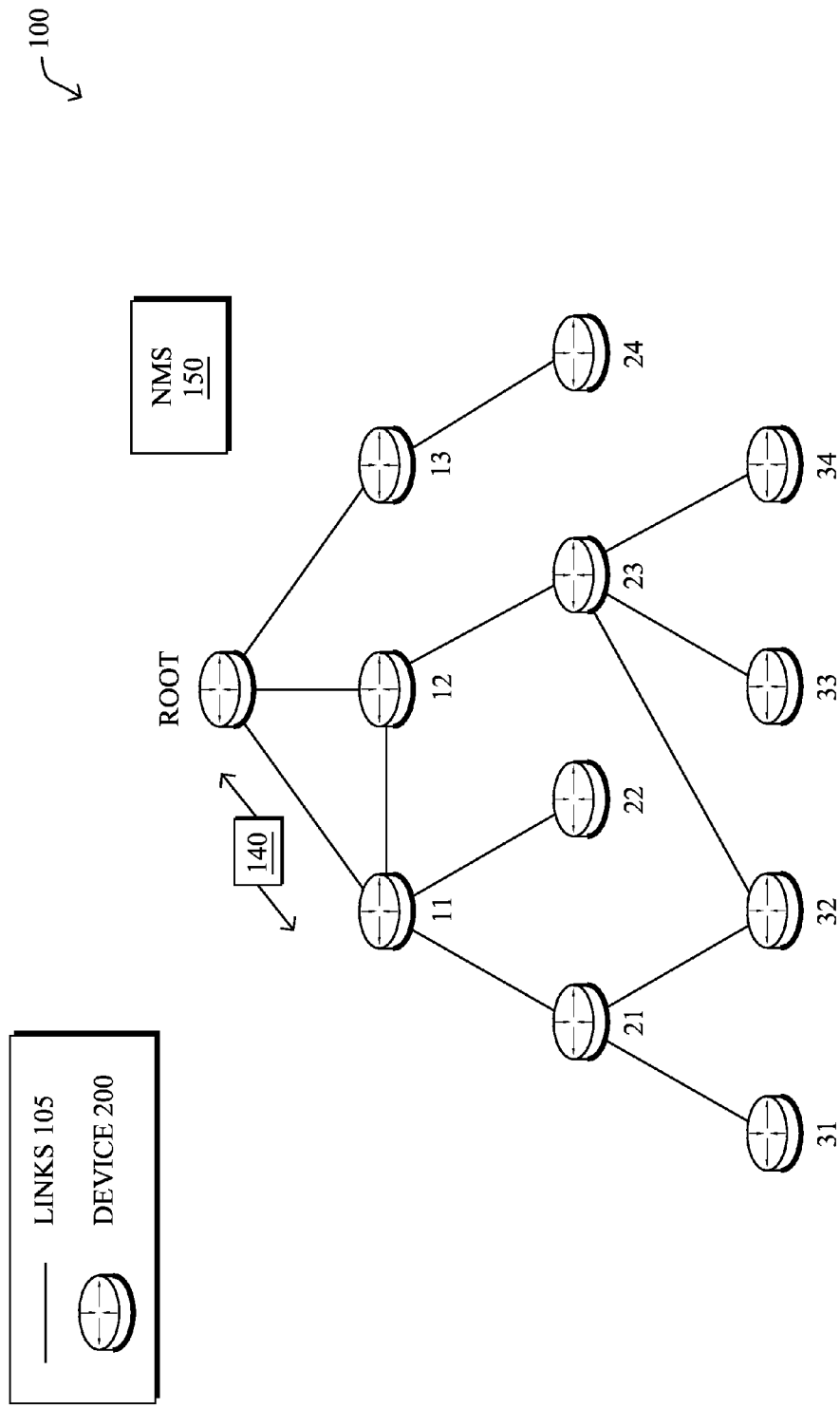
FIG. 1 illustrates an example computer network.

According to one or more embodiments of the disclosure, a computing device (e.g., border router or network management server) transmits a discovery message into a computer network, such as in response to a given trigger. In response to the discovery message, the device receives a unicast reply from each node of a plurality of nodes in the computer network, each reply having a neighbor list of a corresponding node and a selected parent node for the corresponding node. Based on the neighbor lists from the replies and a routing protocol shared by each of the plurality of nodes in the computer network, the device may create a reference topology for the computer network, and based on the selected parent nodes from the replies, may also determine a current topology of the computer network. Accordingly, the device may then compare the current topology to the reference topology to detect anomalies in the current topology.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "ROOT," "11," "12," ... "34," and described in FIG. 2 below) interconnected by various methods of communication, and also a network management server/service (NMS) 150. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" LBR node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
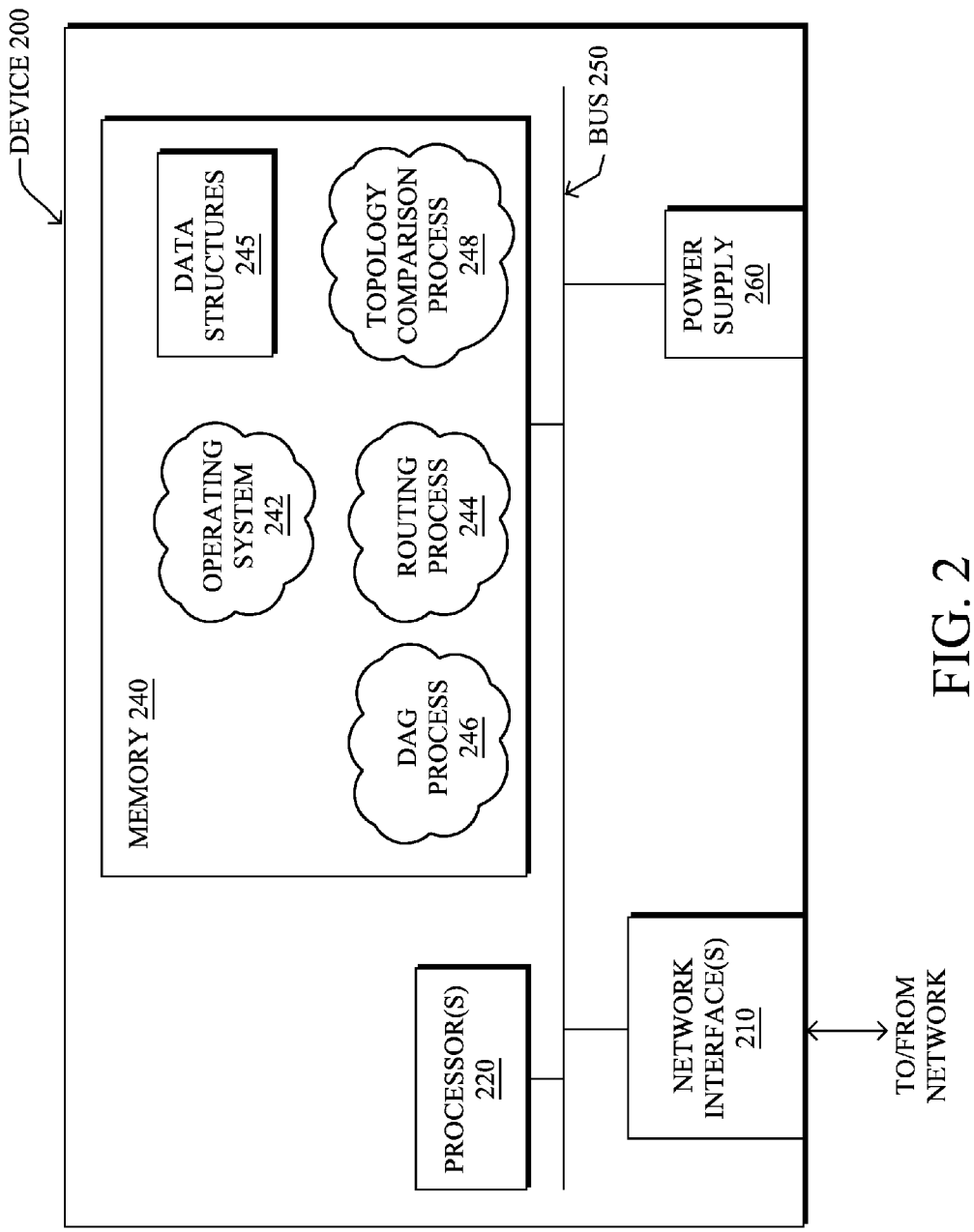
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative topology comparison process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
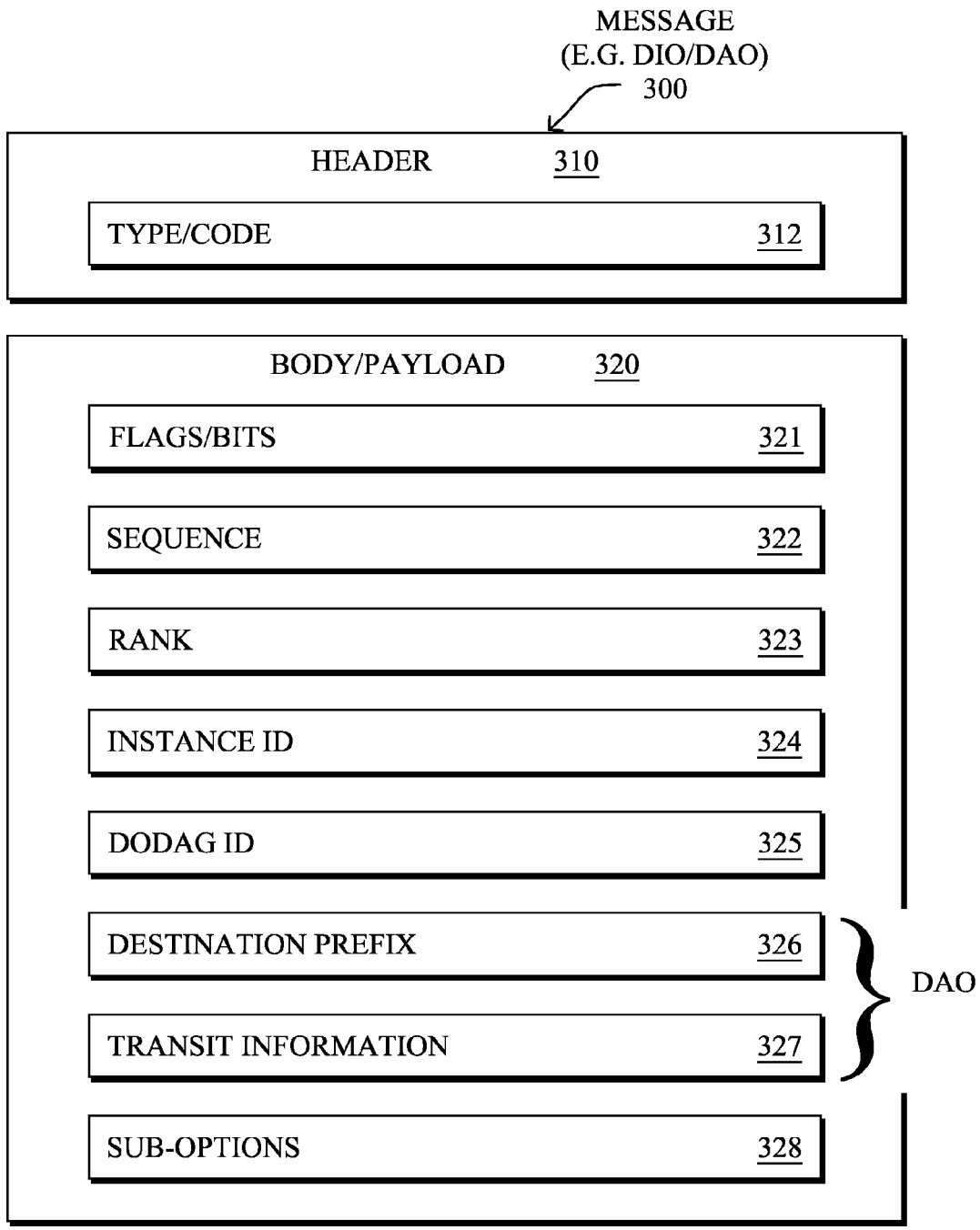
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
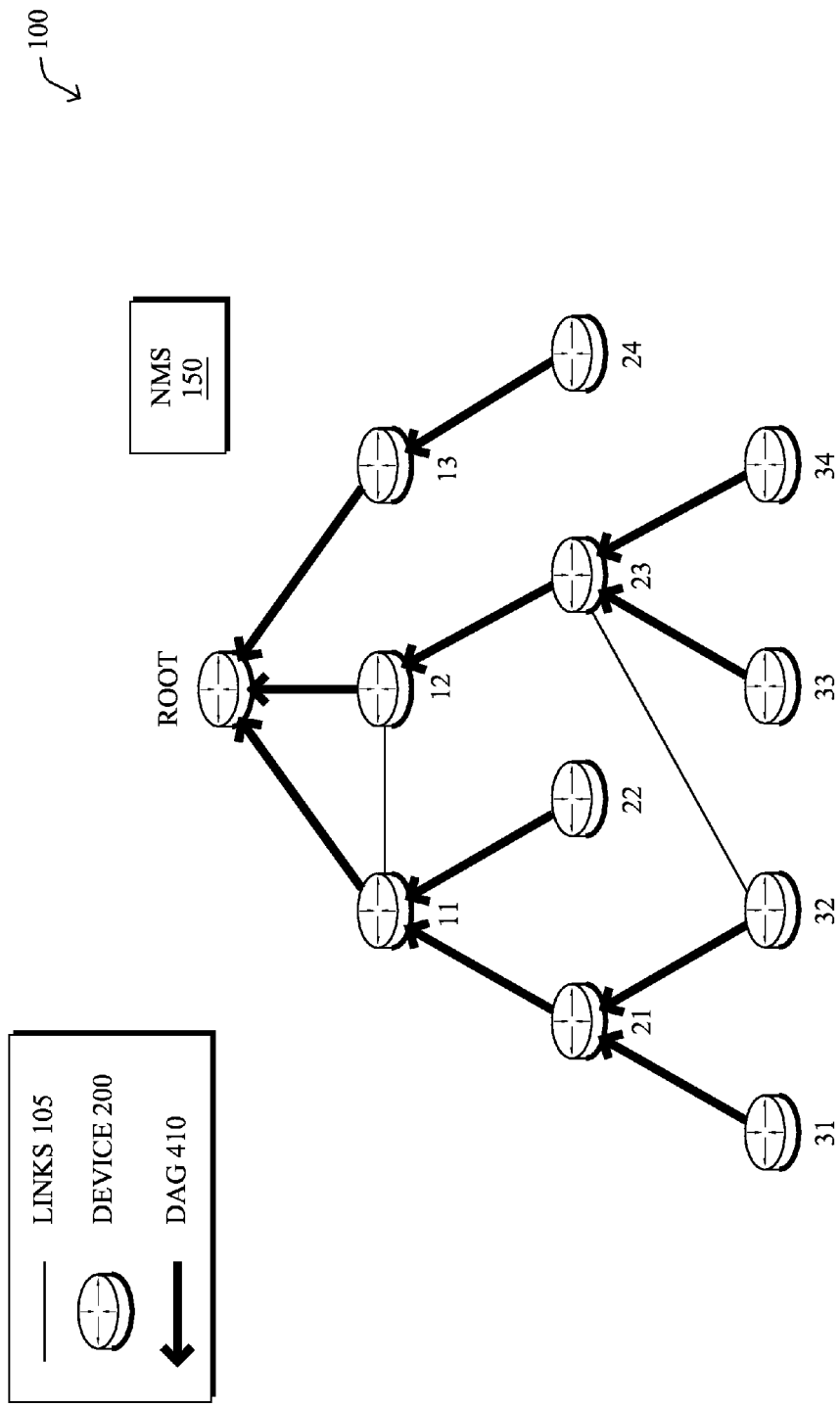
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as solid bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. In addition, the creation of the DAG may also provide for one or more alternate parents (next-hops), such as those shown in the dashed bolded lines, accordingly. Note that while a DAG 410 is shown, other distance vector routing topologies may be created, and a DAG, particularly one created using RPL, is merely one example of a routing protocol topology that may be created and utilized according to the techniques described herein.

As noted above, even with a well-intentioned routing protocol, such as RPL, however, it is worth noting that various misconfigurations and errors may arise in operation. For instance, though an in-use DAG may provide connectivity to all nodes, it may not conform to particular objective of the topology (e.g., low-latency). Alternatively, nodes in the network may not be connected to the DAG, or else loops may be created. In other words, errors in selecting a parent by some nodes could lead to sub-optimal paths or a breakdown of portions of the network, neither of which are strictly local issues, but rather could impact all of the nodes attached to the faulty node.

With particular reference to FIG. 4, a first topology (DAG 410) displays a proper DAG/routing topology formation, where the bolded arrows indicate the DAG edges representing parent-child relationship and the path to the root, while the other links (11-to-12, 23-to-32) indicate neighbor reachability. Assume that the DAG 410 is built using low-latency as the routing metric objective criteria and each link has a latency of 1 ms and each node increments its rank by a factor of 4. (Though this is only a representative example, it presents a simplified but realistic scenario.) Once activated, the DAG 410 is built from the root downwards, and each node computes its rank by adding the step rank to the parents rank (root rank=1). Once the node joins the DAG 410, it will start advertising its rank as well as the path cost (latency value) to reach the root node. For example, node 12 may advertise a rank of 5 and a path cost of 1 ms to neighbor nodes 11 and 23. Node 23 has a choice to select node 12 or node 32 as parent and should select node 12 based on lowest path (latency value) cost according to the objective function. Node 23 then computes its rank as 9 with a path latency cost of 2 ms to reach the root via node 12.

Figure 5:
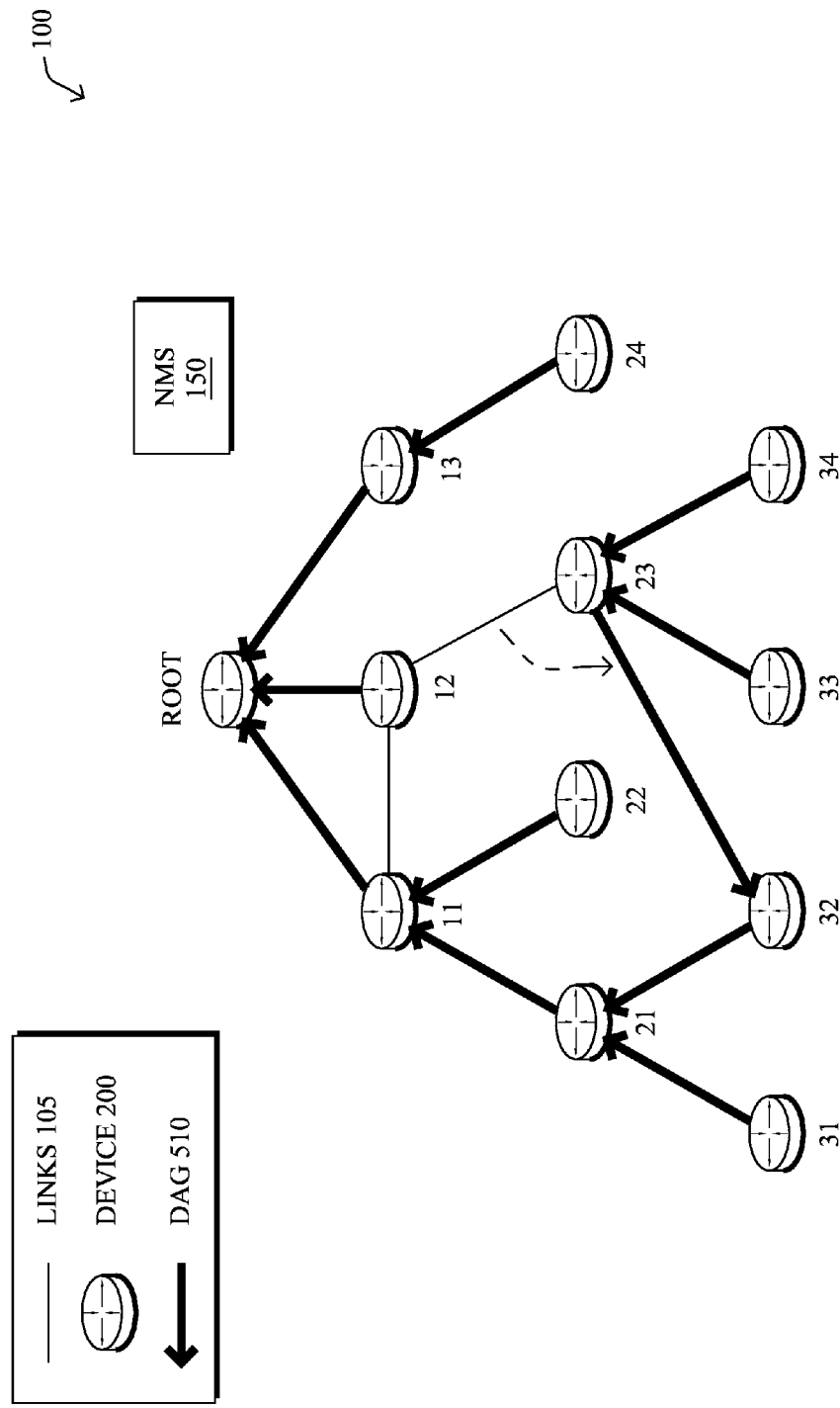
FIG. 5 illustrates another example DAG in the computer network.

FIG. 5, however, illustrates another example DAG 510 that could be created through one or more misconfigurations. For instance, this second DAG 510 displays a pathological case where an error took place in forming the topology optimized on low-latency. In this scenario, all nodes have correctly performed parent selection except node 23, which can receive DIOs from neighbor nodes 12 and 32, but has incorrectly chosen node 32 as the preferred parent (instead of node 12), and node 12 as the alternate/backup parent even though the path cost through node 12 is lower (better) than through node 32.

There could be various reasons leading to this problem, such as a problem in the parent selection logic or an incorrect computation of the link cost between neighbors, noise in path surrounding node 12, etc. Another possible error scenario could be that node 12 is not sending DIOs, leading to node 23 not able to choose node 12 as a parent. This could be, for example, due to a problem in trickle timer logic.

By looking at the two topologies, it can be seen that both DAGs 410 and 510 provide connectivity to all nodes, but the second topology (DAG 510) does not conform to the low-latency objective. As the network administrator can only check connectivity (e.g., using ping) and no latency data is available for conformance check, this issue is very hard to detect since the more optimum path (not selected because of the misbehaving node) is not known. Furthermore, any form of data traffic would follow the routing topology, thus making the detection of such an issue almost impossible. The malformed DAG 510 will continue to remain malformed at each DIO transmit boundary, as the node in error will continue to choose the wrong parent (e.g., due to the erroneous parent selection logic).

Error in selection of a parent in some nodes could lead to sub-optimal paths at other nodes using such nodes in their path to root. Assuming the same nodes happen to be part of the downward route, such an error in selection of parents could also lead to sub-optimal paths in downward direction, too. Furthermore, as noted above, the issue is not always merely local, and all of the nodes attached to the faulty node could be impacted. Troubleshooting in such environments is thus critical, though extremely challenging without automated and in-band processing.

Using a Reference Topology for Troubleshooting

The techniques herein detect path computation/routing topology anomalies in a network that makes use of a distributed routing protocol by comparing the actual routing topology with the routing topology that "should" have been built by the network, should all nodes function properly (based on the retrieval of the physical connectivity: i.e., the list of neighbors seen by the nodes). A troubleshooting engine hosted on a router (e.g., root/LBR) can inform the NMS 150 of issues in the network, misbehaving nodes, etc., so as to trigger repairs in the network.

Specifically, according to one or more embodiments of the disclosure as described in detail below, a computing device (e.g., border router or network management server) transmits a discovery message into a computer network, such as in response to a given trigger. In response to the discovery message, the device receives a unicast reply from each node of a plurality of nodes in the computer network, each reply having a neighbor list of a corresponding node and a selected parent node for the corresponding node. Based on the neighbor lists from the replies and a routing protocol shared by each of the plurality of nodes in the computer network, the device may create a reference topology for the computer network, and based on the selected parent nodes from the replies, may also determine a current topology of the computer network. Accordingly, the device may then compare the current topology to the reference topology to detect anomalies in the current topology.

Illustratively, the techniques described herein may be performed by hardware, software, and/or firmware, such as in accordance with the topology comparison process 248, which may contain computer executable instructions executed by the processor 220 to perform functions relating to the techniques described herein, e.g., in conjunction with routing process 244 (and/or DAG process 246). For example, the techniques herein may be treated as extensions to conventional protocols, such as the illustrative RPL protocol, and as such, may be processed by similar components understood in the art that execute those protocols, accordingly.

Operationally, the techniques herein build a reference topology using information collected from nodes in the network, in order to compare it with the current topology utilized in the network in order to detect anomalies, identify problematic regions within the network, and devise-and-trigger in-band or out-band repair mechanisms. Assume, for sake of a first example, that the current operational topology is DAG 510 of FIG. 5 above.

Figure 6:
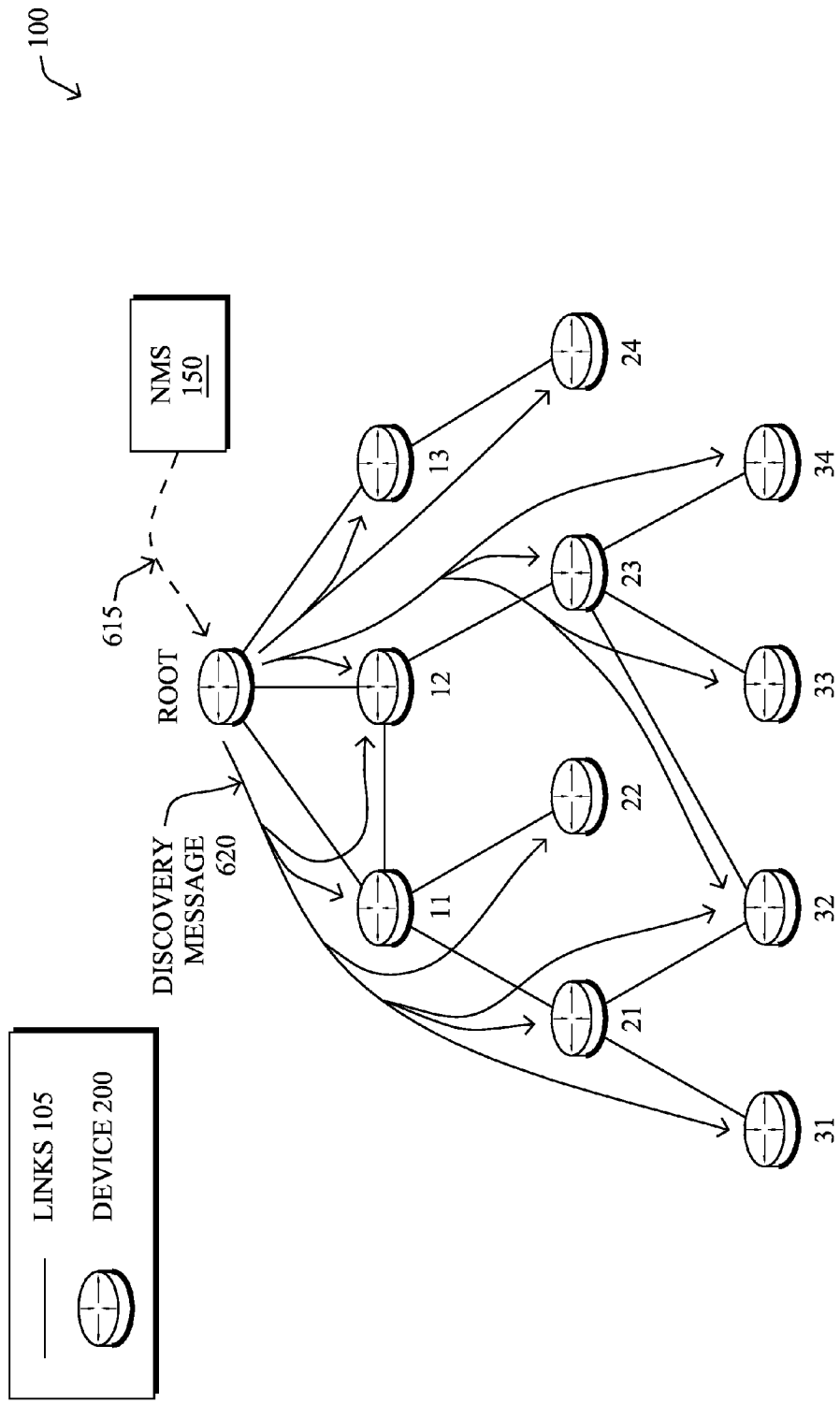
FIGS. 6-7 illustrate example message exchanges in the computer network.

According to one or more embodiments herein, a computing device, such as an NMS 150 or border router (e.g., root) starts the discovery process to build a reference topology. As shown in FIG. 6, for example, in a specific embodiment, a message 615 is sent by the NMS to the border router (root) of the DAG 510 to start the discovery process. Alternatively, the border router itself may trigger the building of the reference topology, or else a system administrator may trigger a message 615 (e.g., directly from a border router console). Illustratively, the reference topology build may be initiated (e.g., by each border router if multiple border routers are present) according to knowledge of the traffic load, such as using period of time where traffic load is low. As defined herein, a "computing device" may be one or both of the NMS 150 or a border router (e.g., root) of the topology.

As shown in FIG. 6, the discovery process may be started by the border router(s) by sending a new topology discovery message 620 to all the nodes in the computer network. While in one embodiment, discovery message 620 is an explicitly designed message (e.g., broadcast/multicast to a group of nodes), an alternative embodiment provides for the discovery message to be piggybacked within a in a routing protocol control plane message, such as within a DIO message 300 (e.g., by setting a newly defined bit in the DIO message). Note also that should the NMS want to collect the information from nodes directly, this can be indicated within the message 620, or else during a node configuration phase with the NMS (e.g., static, DHCP, etc.), such that discovery message 620 is an extension of a configuration message from the NMS to the nodes of the network.

Figure 7:
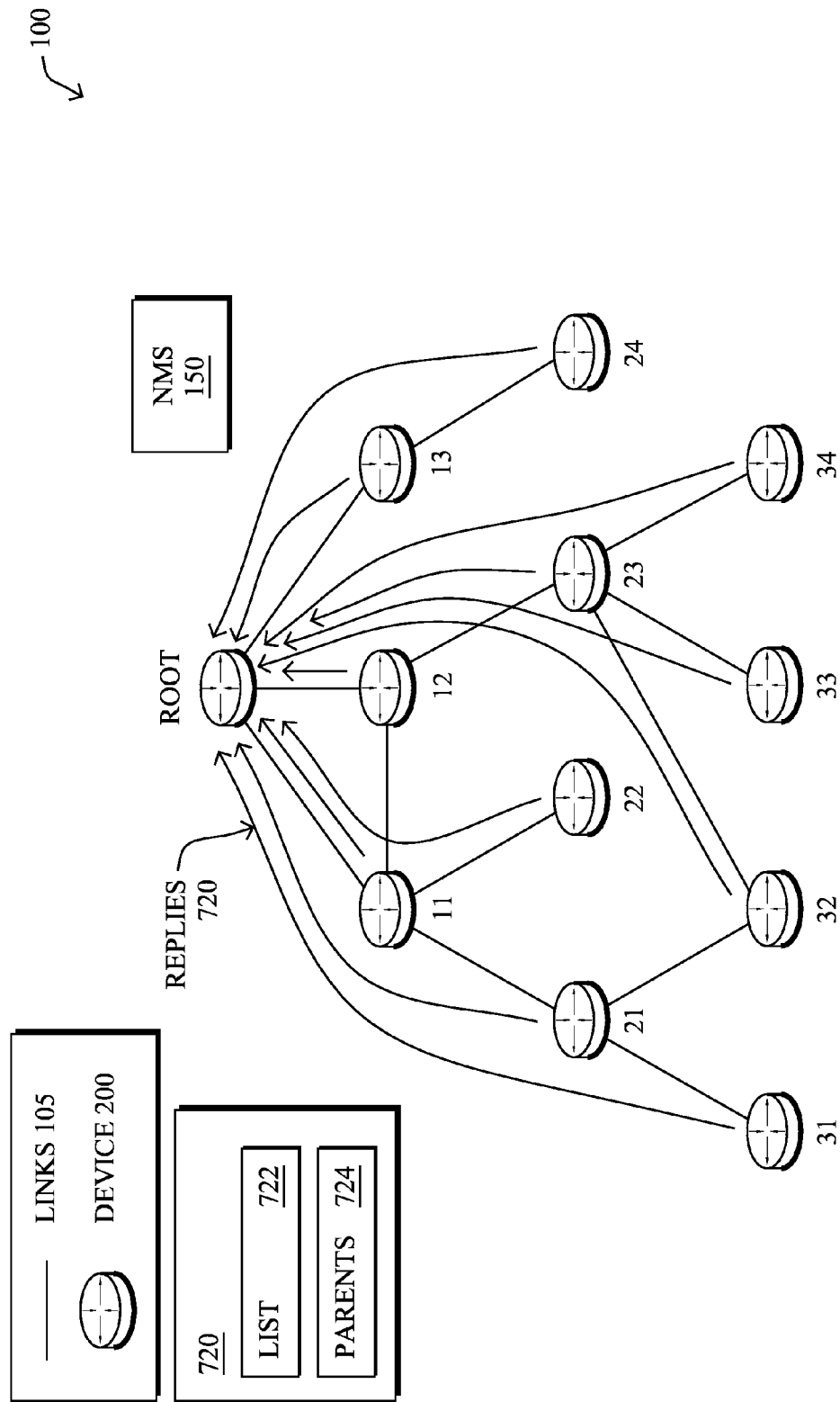

The discovery message 620 sent by the border router may then be transmitted as a link local multicast message. As shown in FIG. 7, each node that receives the message 620 processes the message and responds with a unicast Topology-Response message 720, which carries a neighbor list/database 722 and a highlight (e.g., separate listing, set flags/bits, etc.) of the selected parent node 724 for the current topology, and optionally any selected alternate parent nodes. In other words, the reply 720 from each node specifically has a list of neighbors, and not just the selected preferred/back-up parent/next-hops. Notably, the message 720 may also carry other useful information for the particular routing protocol, such as path cost information, link quality metrics, a routing domain identifier (e.g., AS number in OSPF, EIGRP, BGP, instance-ID in RPL, etc.), a non normalized link cost, any associated node/link attributes/constraints, and optionally additional information such as statistics like number of times a particular link/peer served as a selected parent.

Note that in one specific embodiment, the nodes can optimize transmission of this information by piggybacking the message 720 in a routing control plane message if one is scheduled, such as with RPL by combining this information in the DAO message 300 (e.g., via TLVs identifying topology response information), or else in an OSPF link state advertisement (LSA), etc., depending upon the underlying routing protocol.

Based on the neighbor lists 722 from the replies 720, and a routing protocol shared by each of the plurality of nodes in the computer network (e.g., RPL, OSPF, etc.), the computing device may then create a reference topology for the computer network, such as the DAG 410 shown in FIG. 4 as an "ideal" solution that should have been computed by the network nodes. At the same time, the computing device also determines a current topology of the computer network based on the selected parent nodes 724 from the replies, such as the DAG 510 shown in FIG. 5, illustrating how node 23 has selected an improper parent, as described above.

By comparing the current topology to the reference topology, the computing device may be able to detect anomalies in the current topology, which may be used in multiple areas of troubleshooting. For example, as shown in FIG. 5, the detected anomaly in the current topology could be a malformed topology having one or more incorrectly selected parent nodes. For instance, assume that due to a software anomaly, node 23 makes an incorrect switch and selects node 32 as the preferred parent and node 12 as an alternate/backup parent, as shown in DAG 510 of FIG. 5. Upon receiving this information, the computing device compares this decision with the reference topology (DAG 410), and flags an error for the next phase of recovery, described below.

Figure 8:
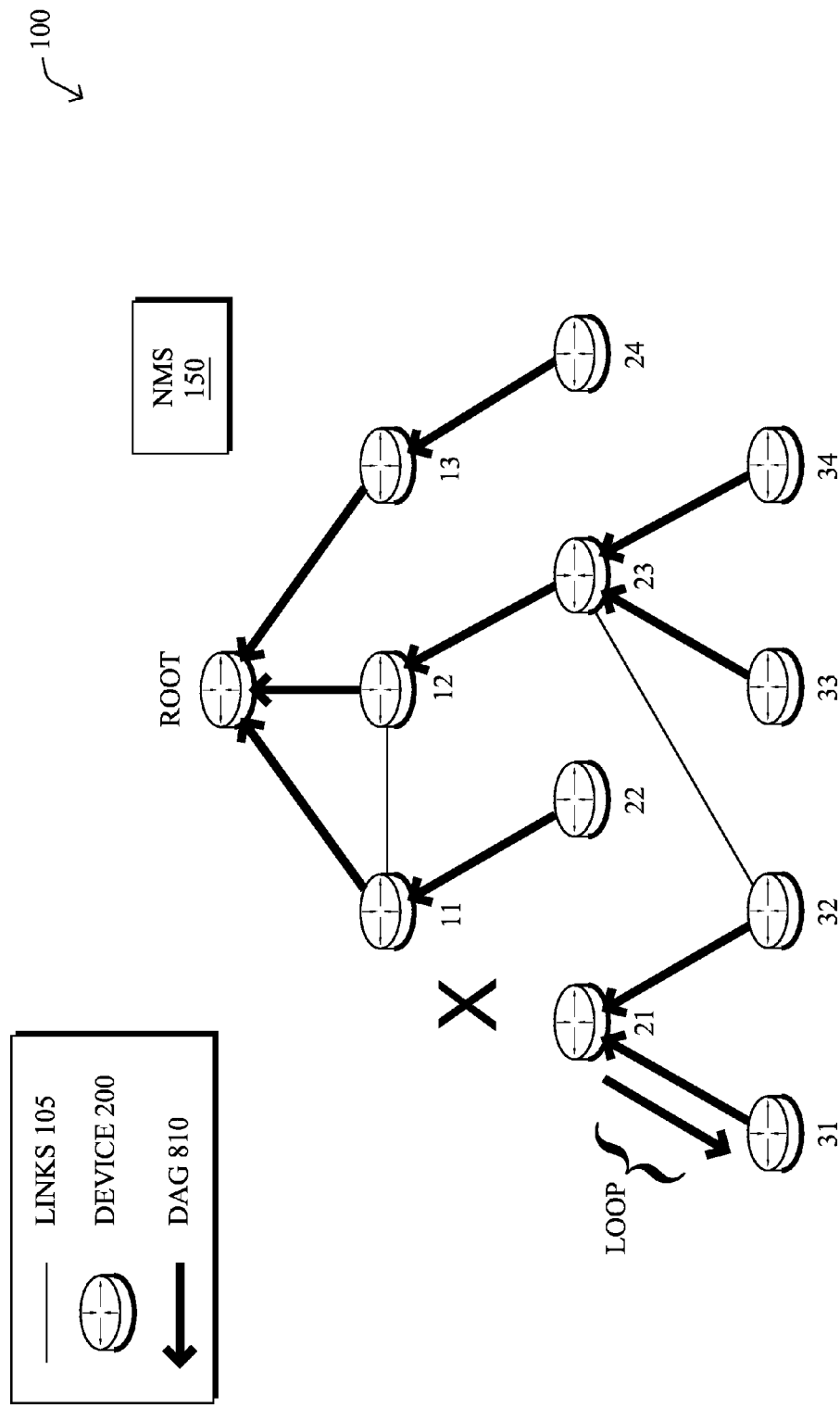
FIG. 8 illustrates another example DAG in the computer network.

In addition, as shown in another example potential "current topology" of FIG. 8, DAG 810 as discovered by the computing device may allow for the detection of a loop as the anomaly. That is, for example, due to noise between node 11 and node 21, node 21 may lose connection with its parent (node 11), and sends a "poison DIO" message to its sub-nodes (child node 31 and others). If this poisoning message is lost, node 31 may continue to treat node 21 as its parent. Subsequently, as part of discovery, if node 21 chooses node 31 as its parent, as shown in FIG. 8, it may then send this information to the computing device. Due to the loop condition, the message from node 21 reaches node 31 and loops back to node 21. This anomaly is detected by node 31 as a loop formation and it may trigger recovery procedures. However, the techniques herein provide for another safety mechanism against loops such as this, since the comparison to the reference topology would detect the loop anomaly.

Figure 9:
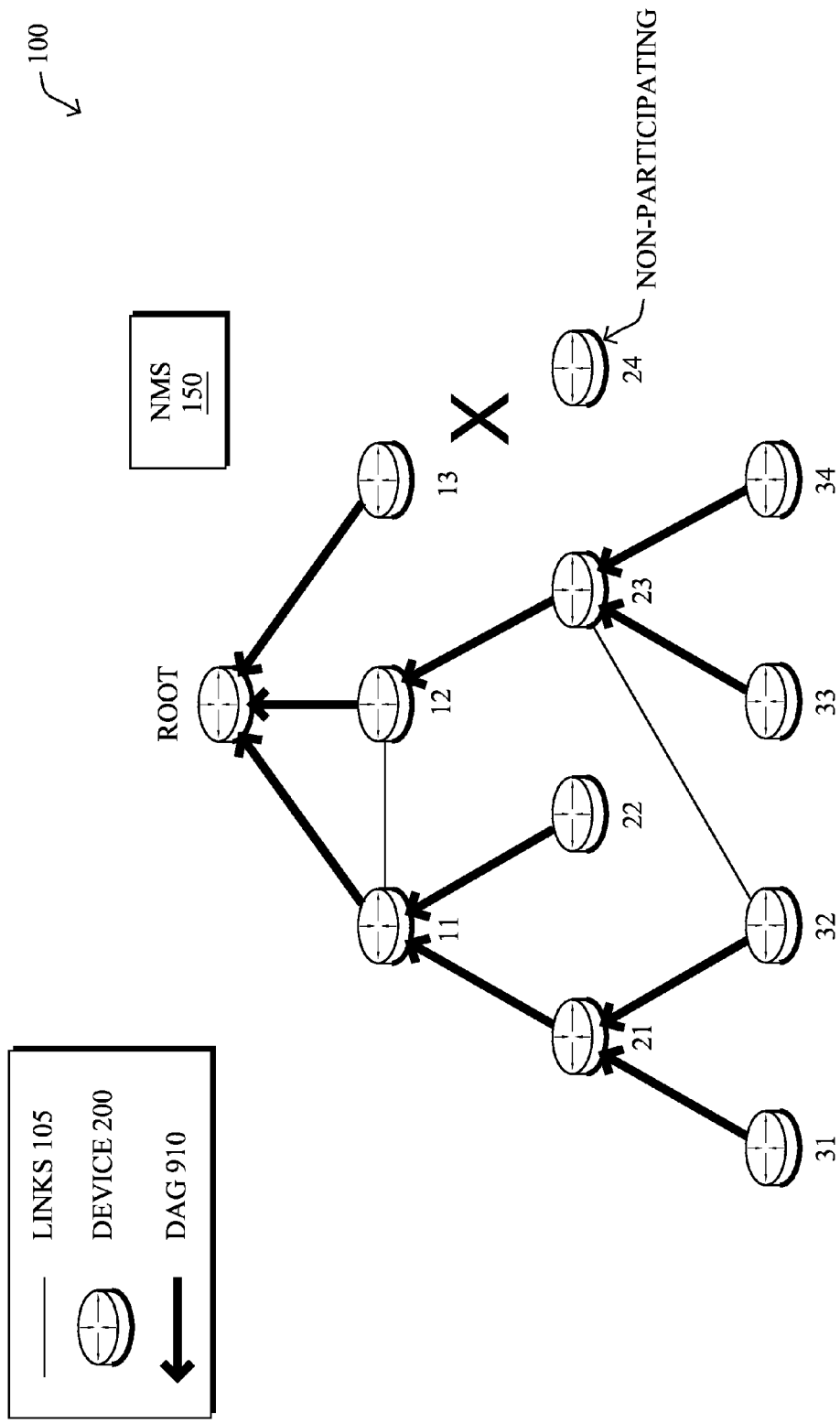
FIG. 9 illustrates still another example DAG in the computer network.

Still further, the detected anomaly in the current topology could be an incomplete topology, having one or more non-participating nodes. For example, assume that the border router is aware of all of the nodes in the network, such as through configuration, dynamic discovery, or perhaps acting as a DHCP relay agent during IPv6 address assignment (i.e., as IPv6 addresses are assigned, the border router builds a database of nodes participating to the computer network). Upon receiving the reply messages 720, assume that the current topology appears as shown in FIG. 9, where node 24 is unattached, i.e., non-participating in the topology. By comparing the current topology to the reference topology, or else even by determining that an expected node has not joined the topology after a fixed time, the computing device can mark these nodes as failed nodes and initiate recovery procedures.

Note that any time the neighbor list changes (neighbor addition/removal) or else a preferred/selected parent changes, the corresponding node may notify the computing device of this change, such as via an updated reply message 720 (e.g., a topology-change message) sent as a unicast message directly to the computing device. The computing device may validate this change and accept it to update the reference topology. At this point, the computing device may perform another current routing topology check by comparing the existing routing topology and the reference topology. In other words, the computing device may recreate the reference topology, redetermine the current topology, and recompare the reference topology and current topology.

Figure 10:
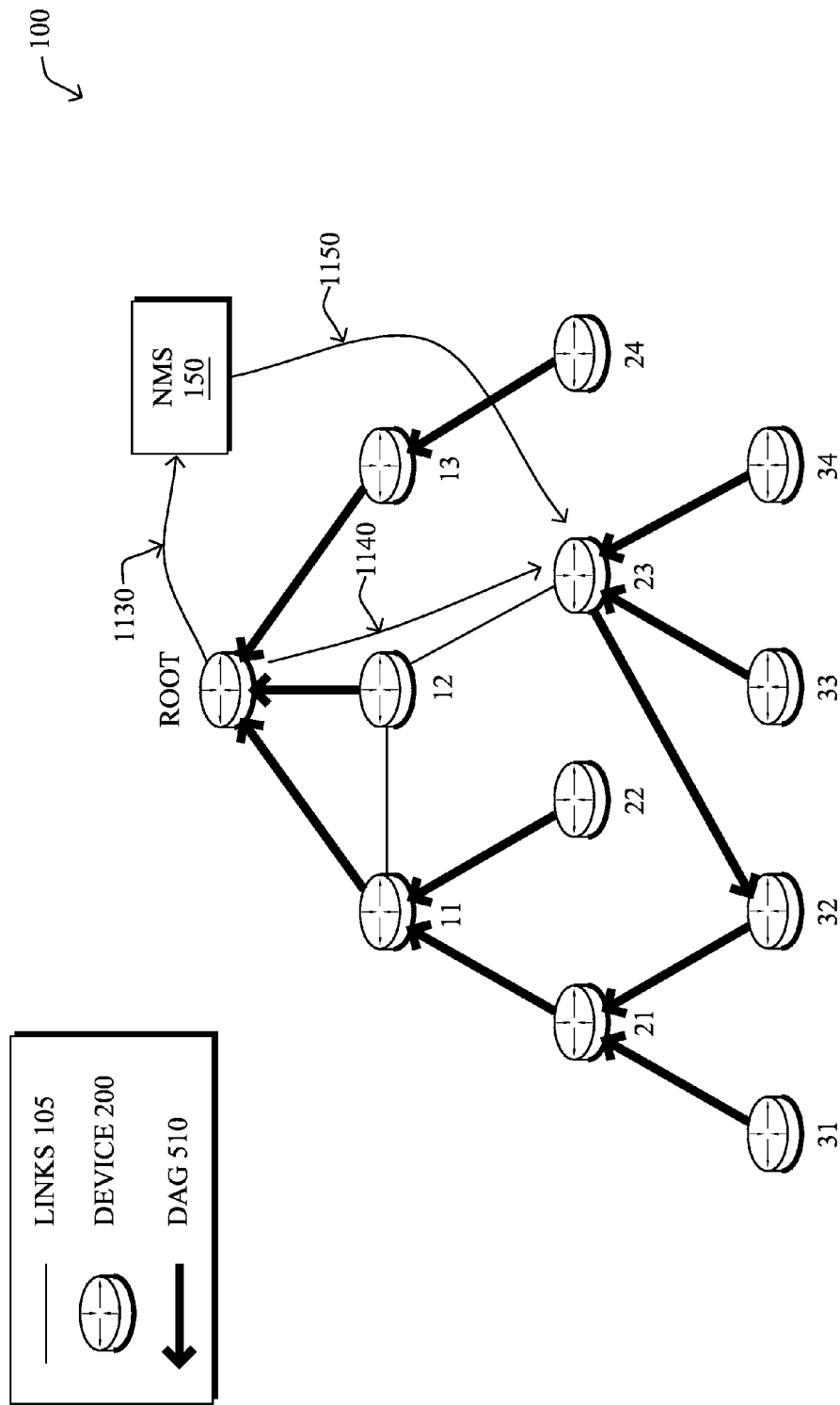
FIG. 10 illustrates another example message exchange in the computer network.

In accordance with one or more embodiments herein, various actions may be triggered by the system once the anomaly has been detected, as discussed with reference to FIG. 10 (and again DAG 510). For instance, in one embodiment, if an anomaly is detected by a border router as the computing device, then the border router may sends a message 1030 to the NMS 150 reporting the anomaly (e.g., bad parent selection, loop condition, etc). The anomalies may then be analyzed at the NMS for any corrective action.

Alternatively, in another embodiment, a set of rules are specified that list the set of actions that can be fixed by the border router, or that require an action from the NMS. For instance, if the problem can be fixed by the border router, such as where a node has inappropriately selected an incorrect next-hop/parent because a control message was lost, the border router may first try to send a unicast message 1040 to the faulty node (e.g., node 23), in addition to a summary report 1030 to the NMS (or other central management device).

It may be determined, however, that the problem cannot be fixed (i.e., determining an inability to correct a detected anomaly), either because the attempt of the border router to fix the problem has failed or the problem seems non-solvable by the border router (e.g., a node selects three preferred parents instead of one, regardless of their rank). In this case, the border router may simply send a notification to the NMS with a summary of the report. At this point the NMS can either send a suggestion of fix to be handled by the border router, or could alternatively perform some action itself, such as by sending a unicast message 1050 to the faulty node (for example, the NMS could perform a firmware upgrade). Note that reporting does not require that the neighbor database and reference topology be available at the NMS, and the border route may simply report the nature of the anomaly.

Figure 11:
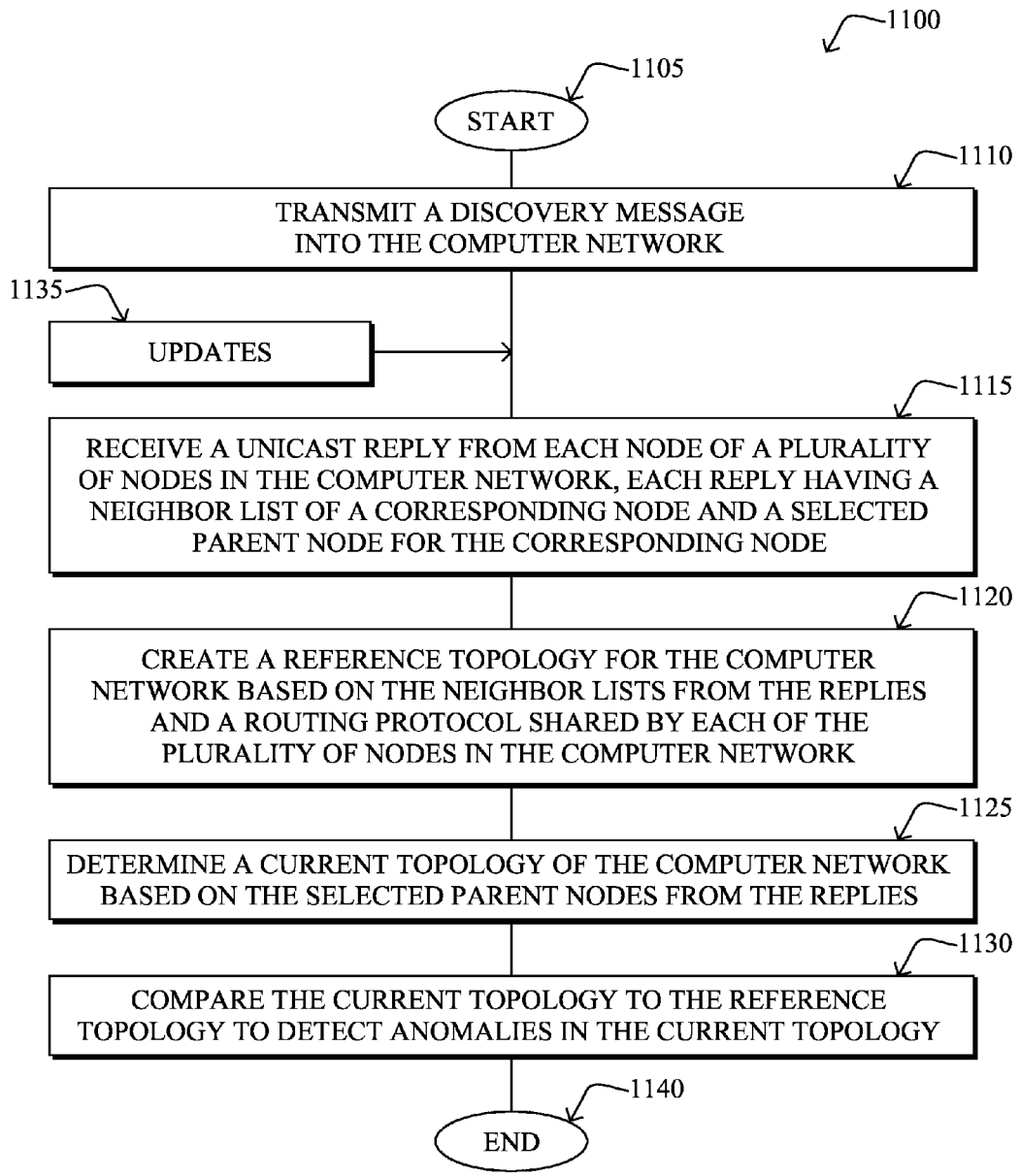
FIGS. 11-12 illustrate example simplified procedures for providing for troubleshooting of a current routing topology based on a reference topology in a computer network.

FIG. 11 illustrates an example simplified procedure for providing for troubleshooting of a current routing topology based on a reference topology in a computer network in accordance with one or more embodiments described herein. The procedure 1100 may start at step 1105, and continues to step 1110, where, as described in greater detail above, a computing device, such as the border router (root) or NMS 150 transmits a discovery message 620 into the computer network 100 to determine the current state of the network. In response, in step 1115, the computing device receives a unicast reply 720 from each node of a plurality of nodes in the computer network, each reply having a neighbor list 722 of a corresponding node and a selected parent node 724 for the corresponding node.

Based on the neighbor lists from the replies and a routing protocol shared by each of the plurality of nodes in the computer network (e.g., RPL with a particular objective function), in step 1120 the computing device may create a reference topology for the computer network (e.g., DAG 410), and may also determine, in step 1125, a current topology of the computer network (e.g., DAG 510) based on the selected parent nodes from the replies. As such, in step 1130, the computing device can compare the current topology to the reference topology to detect anomalies in the current topology, as described in detail above. Note that any updates from nodes may also be received in step 1135, and the reference topology and current topology may be rebuilt and redetermined, such that a re-comparison can be made to detect any new anomalies. The procedure illustratively ends in step 1140, though may continue to receive further updates, accordingly.

Figure 12:
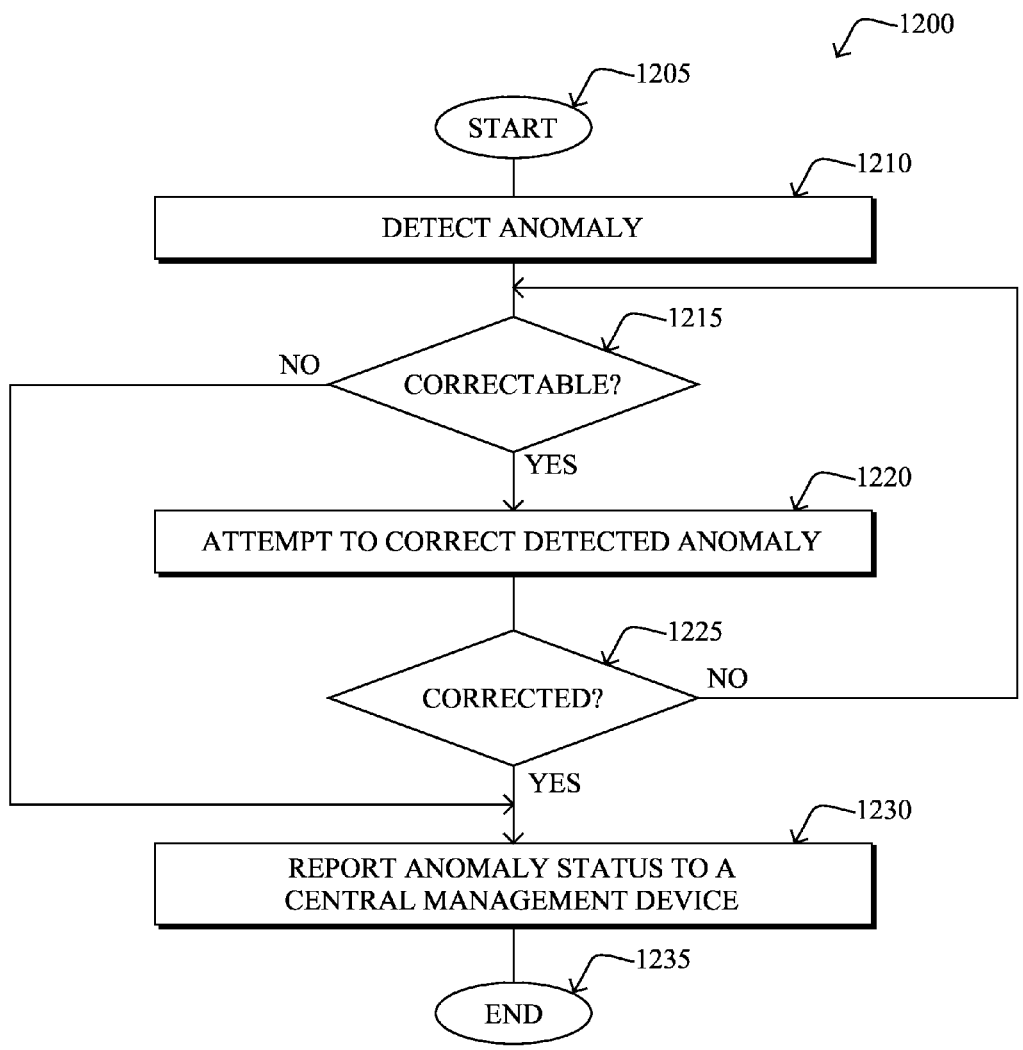

In addition, FIG. 12 illustrates another example simplified procedure for providing for troubleshooting of a current routing topology based on a reference topology in a computer network in accordance with one or more embodiments described herein, e.g., as a continuation of procedure 1100. The procedure 1200 may start at step 1205, and continues to step 1210, where, as described in greater detail above, an anomaly is detected, such as in response to the comparison in step 1135, and if the anomaly is correctable in step 1215 by the computing device (e.g., the border router), then in step 1220 the computing device may correspondingly attempt to correct the detected anomaly, as described above. If uncorrected in step 1225, then the procedure may determine if further attempts should be made in step 1215. If the anomaly is corrected, or in response to determining that it is not correctable by the computing device, then in step 1230 the anomaly may be reported to a central management device (e.g., from a border router to an NMS 150). The procedure 1200 illustratively ends in step 1235.

It should be noted that while certain steps within procedures 1100-1200 may be optional as described above, the steps shown in FIGS. 11-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the procedures are not meant to be mutually exclusive.

The techniques described herein, therefore, provide for troubleshooting of a current routing topology based on a reference topology in a computer network. In particular, the techniques herein offer a complete solution of collecting information required from nodes for building a reference topology and comparing it with the already formed topology, whose results can be used in detecting a myriad of problems which can help in devising and triggering repair mechanisms. In other words, the techniques herein enhance the ability to perform troubleshooting in the Internet of Things, a very challenging problem, and make use of "repair" rules (e.g., hosted on the border router and/or the NMS) to trigger the appropriate actions to fix the issues encountered in the network. Though there are mechanisms for pulling various network management information from the nodes within the network for different purposes, none collect raw data from nodes and build a reference topology to compare against a current topology and use that information to devise repair mechanisms.

While there have been shown and described illustrative embodiments that provide for troubleshooting of a current routing topology based on a reference topology in a computer network, it is to be understood that various other adaptations and modifications may be made within the spirit and scope of the embodiments herein. For example, the embodiments have been shown and described herein with relation to LLNs and the RPL protocol. However, the embodiments in their broader sense are not as limited, and may, in fact, be used with other types of networks and/or protocols. Also, while the techniques generally describe DAGs and distance vector routing, those skilled in the art will appreciate that any routing topology may be used for the comparison described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting, from a computing device in a computer network, a discovery message into the computer network;
   receiving, in response to the discovery message, a unicast reply from each node of a plurality of nodes in the computer network, each reply having a neighbor list of a corresponding node and a parent node for the corresponding node;
   creating a reference topology for the computer network based on the neighbor lists from the replies and a routing protocol shared by each of the plurality of nodes in the computer network, wherein the reference topology represents an ideal topology that should have been computed by the computer network when the plurality of nodes in the computer network are functioning properly;
   determining a current topology of the computer network based on the selected parent nodes from the replies, wherein the current topology is an actual topology that is currently computed for the computer network; and
   comparing the current topology to the reference topology to detect anomalies in the current topology.

2. The method as in claim 1, further comprising:
   detecting an anomaly in the current topology as a malformed topology having one or more incorrectly selected parent nodes.

3. The method as in claim 1, further comprising:
   detecting an anomaly in the current topology as a loop within the current topology.

4. The method as in claim 1, further comprising:
   detecting an anomaly in the current topology as an incomplete topology having one or more non-participating nodes of the plurality of nodes of the computer network.

5. The method as in claim 1, further comprising:
   attempting to correct a detected anomaly; and
   reporting an anomaly status to a central management device.

6. The method as in claim 1, further comprising:
   determining an inability to correct a detected anomaly; and
   reporting an anomaly status to a central management device.

7. The method as in claim 1, further comprising:
   receiving one or more updated replies from one or more nodes of the computer network, the one or more updated replies having at least one of either an updated neighbor list of a corresponding node or an updated selected parent node for the corresponding node; and
   recreating the reference topology, redetermining the current topology, and recomparing the reference topology and current topology.

8. The method as in claim 1, wherein each reply further has at least one metric selected from: link costs, link constraints, and link statistics.

9. The method as in claim 1, wherein each reply is piggybacked in a routing protocol control plane message.

10. The method as in claim 1, wherein the discovery message is piggybacked in a routing protocol control plane discovery message.

11. The method as in claim 1, wherein one or more replies further have a selected alternate parent node for the corresponding node.

12. The method as in claim 1, wherein the computing device is one of either a border router of the computer network or a network management server (NMS) for the computer network.

13. An apparatus, comprising:
    one or more network interfaces to communicate with a computer network;
    a processor coupled to the network interfaces and adapted to execute one or more processes; and
    a memory configured to store a process executable by the processor, the process when executed operable to:
    transmit a discovery message into the computer network;
    receive, in response to the discovery message, a unicast reply from each node of a plurality of nodes in the computer network, each reply having a neighbor list of a corresponding node and a parent node for the corresponding node;
    create a reference topology for the computer network based on the neighbor lists from the replies and a routing protocol shared by each of the plurality of nodes in the computer network, wherein the reference topology represents an ideal topology that should have been computed by the computer network when the plurality of nodes in the computer network are functioning properly;
    determine a current topology of the computer network based on the selected parent nodes from the replies, wherein the current topology is an actual topology that is currently computed for the computer network; and compare the current topology to the reference topology to detect anomalies in the current topology.

14. The apparatus as in claim 13, wherein the process when executed is further operable to:
   detect an anomaly in the current topology as a malformed topology having one or more incorrectly selected parent nodes.

15. The apparatus as in claim 13, wherein the process when executed is further operable to:
   detect an anomaly in the current topology as a loop within the current topology.

16. The apparatus as in claim 13, wherein the process when executed is further operable to:
   detect an anomaly in the current topology as an incomplete topology having one or more non-participating nodes of the plurality of nodes of the computer network.

17. The apparatus as in claim 13, wherein the process when executed is further operable to:
   attempt to correct a detected anomaly; and
   report an anomaly status to a central management device.

18. The apparatus as in claim 13, wherein the process when executed is further operable to:
   determine an inability to correct a detected anomaly; and
   report an anomaly status to a central management device.

19. The apparatus as in claim 13, wherein the process when executed is further operable to:
   receive one or more updated replies from one or more nodes of the computer network, the one or more updated replies having at least one of either an updated neighbor list of a corresponding node or an updated selected parent node for the corresponding node; and
   recreate the reference topology, redetermine the current topology, and recompare the reference topology and current topology.

20. The apparatus as in claim 13, wherein each reply further has at least one metric selected from: link costs, link constraints, and link statistics.

21. A system, comprising:
   a plurality of nodes of a computer network configured to participate in generating a current routing topology; and
   a border router configured to transmit a discovery message into the computer network;
   the plurality of nodes further configured to transmit, in response to receiving the discovery message, a unicast reply to the border router, the reply having a neighbor list of a corresponding node and a parent node for the corresponding node;
   the border router further configured to receive the replies, create a reference topology for the computer network based on the neighbor lists from the replies and a routing protocol shared by each of the plurality of nodes in the computer network, determine a current topology of the computer network based on the selected parent nodes from the replies, and compare the current topology to the reference topology to detect anomalies in the current topology,
   wherein the reference topology represents an ideal topology that should have been computed and the current topology is an actual topology that has been computed by the computer network when the plurality of nodes in the computer network are functioning properly, and
   wherein the current topology is an actual topology that is currently computed for the computer network.

* * * * *